June 17, 1924.  1,498,077
A. E. DOMAN
REGULATING SYSTEM FOR ELECTRIC GENERATORS
Filed Nov. 21, 1919
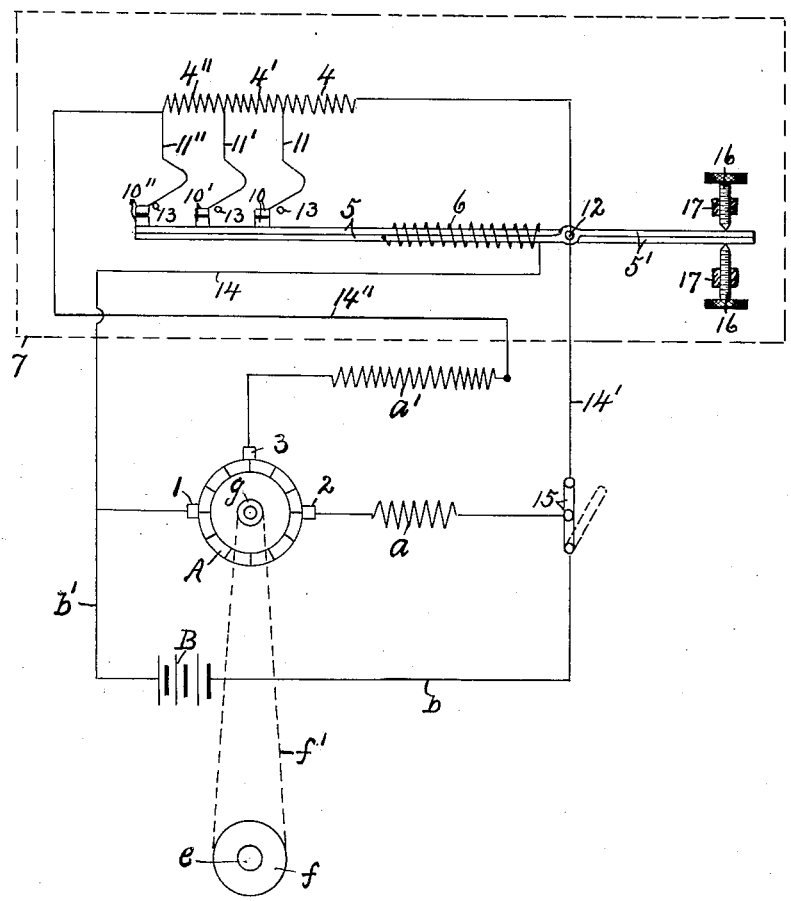

Patented June 17, 1924.

1,498,077

UNITED STATES PATENT OFFICE.

ALBERT E. DOMAN, OF ELBRIDGE, NEW YORK, ASSIGNOR TO DOMAN MANUFACTURING CORPORATION, OF ELBRIDGE, NEW YORK, A CORPORATION OF NEW YORK.

REGULATING SYSTEM FOR ELECTRIC GENERATORS.

Application filed November 21, 1919. Serial No. 339,547.

*To all whom it may concern:*

Be it known that I, ALBERT E. DOMAN, of Elbridge, in the county of Onondaga, in the State of New York, have invented new and useful Improvements in Regulating Systems for Electric Generators, of which the following, taken in connection with the accompanying drawings, is a full, clear, and exact description.

This invention relates to an electric regulating system for variable speed dynamo electric machines commonly known as "generators," adapted to be used more particularly in connection with an internal combustion engine and a storage battery of a motor vehicle for ignition, lighting, starting and charging purposes, but it will be evident from the following description that certain features of the invention may be used to regulate the voltage or current output of any variable speed dynamo or to regulate the charging current through any storage battery or through any one or more translating devices receiving current from any electric current generator having a widely variable voltage or current output.

The main object is to provide simple and efficient means for automatically regulating the current output or voltage of any generator within certain limits of safety according to the limitations of the device which is to receive said current.

In the use of a dynamo electric machine and storage battery in connection with a motor vehicle in which the dynamo is driven by an internal combustion engine, the current output or voltage varies, of course, with the varying speeds of the engine and in many systems where the dynamo and battery are both used for lighting and ignition purposes and the battery is automatically charged by the dynamo current, the current output and voltage of the dynamo is increased more or less as the charging of the battery increases to or beyond its full charge limit and is further increased by the diversion of a greater current through the shunt winding of the dynamo, all of which, if not properly regulated, frequently results in overheating, overcharging, and consequent impairment or destruction of the battery.

I have found that a dynamo electric machine of the "third brush type" is most satisfactory and efficient for this particular work in that it automatically regulates, to a certain extent, the current output under widely varying speeds, but, when charging the battery, as the latter becomes more fully charged, instead of gradually reducing the charge as desired as the charging progresses and battery voltage increases, it actually increases the charging rate which if continued under certain conditions will eventually ruin the battery by overheating as a result of overcharging.

One of the specific objects, therefore, is to provide a system of current and voltage regulation for use in connection with a "third brush type" of dynamo electric machine by which it will be impossible under normal working conditions, to overcharge or overheat the battery under any speed and thereby to prolong the life and energy of said battery for an indefinite period of time.

In other words, I have sought to make the regulation of the current output and voltage of the dynamo dependent upon the automatic introduction of a gradually increasing electrical resistance in the shunt field circuit as the speed of the dynamo increases and to regulate said resistance by the heat developed in said circuit so that as the heat increases the resistance in the shunt field circuit will be correspondingly increased and will thereby keep the current output and voltage and rate of charge of the battery within safe limits.

Another object is to provide automatic means for preventing the separation of the circuit breaker contacts as the thermostatic bar is deflected by variations of external or atmospheric temperatures as for example, during winter and summer periods.

Other objects and uses relating to specific parts of the device as illustrated will be brought out in the following description.

The drawing is a diagrammatic view of a dynamo and storage battery circuit adapted to be used in connection with a motor vehicle having an internal combustion engine as its motive power and in which the dynamo is driven by the engine in any well-known manner not shown, said view also including diagrammatically one form of my improved system for regulating the current output of the dynamo and particularly such part of said current output as may be used for charging the battery.

This system of regulation is adapted to be used more particularly in connection with a compound wound dynamo of what is commonly known as the "third brush type", indicated by a commutator —A— and three brushes as —1—, —2—, and —3—, said dynamo having the usual series winding —a— and a shunt field winding —a'— connected respectively at one end to the brushes —2— and —3—.

A storage battery —B— is suitably connected by wires —b—b'— to the dynamo circuit to receive current therefrom for charging purposes and is also adapted to furnish the necessary current for starting, lighting and ignition when used in motor vehicles having an internal combustion engine as its motive power.

Current regulating system.

As illustrated the current regulator comprises, in addition to the shunt field winding —a'—, a plurality of, in this instance, three electrical resistance coils —4—, —4'— and —4"—, a thermostatic bar —5—, an electric heater coil —6— and suitable means for counteracting the effect of varying atmospheric changes upon the thermostatic bar, all of which parts may be enclosed in a suitable case as —7—, shown by dotted lines, to complete the regulator as a unitary article of manufacture for convenient installation and connection with the dynamo and battery circuits.

The electrical resistances —4—, —4'—, and —4"— are connected in the shunt field circuit in series with each other and with the shunt field winding —a'— for regulating the current output of the dynamo under varying speeds as hereinafter described.

The effect of these resistances upon the shunt field circuit is normally nullified by a short circuit connection consisting, in this instance, of the thermostatic bar —5— and suitable circuit breakers —10—, —10'—, and —10"—.

These circuit breakers are arranged in sequence in the order of the resistances and are connected by wires —11—, —11'—, and —11"— to the shunt field circuit at the ends of said resistances respectively so that when the circuit breakers are closed, the bar —5— will be in direct electrical connection with the shunt field winding around the resistances, thereby normally cutting the latter out of the circuit so far as their influence upon the shunt field and dynamo is concerned.

It is well known, however, that if a resistance is introduced in the shunt field circuit of a dynamo of this type it has the effect of reducing the current output and voltage in proportion to the degree of such resistance, and that a greater or less degree of electric heat may be developed in certain parts of said circuit proportionate to the speed of the dynamo and voltage and the purpose of this invention is to utilize this heat in the operation of the thermostatic bar to automatically cut in the desired amount of resistance which will keep the current output and voltage of the dynamo within safe limits for charging or other purposes.

In carrying out this purpose, one end of the bar —5— is supported by a pivot —12— so that its remaining portion may be free to deflect under varying temperatures according to the ratio of expansion of its members and the degree to which the bar is heated.

One set of contacts of the circuit breakers —10—, —10'—, and —10"— is mounted on the free end of the bar —5—, the members of which have different coefficients of expansion and are arranged to deflect away from the contacts of the other set as the temperature of the bar increases.

These contacts are arranged lengthwise of the bar and it therefore follows that as the temperature of said bar increases they will be successively separated from the free end toward the pivot, thereby causing the resistances —4"—, —4'—, and —4— to be successively cut into the shunt field circuit to keep the current output within safe limits as the speed of the dynamo increases.

The ends of the conductors —11—, —11'—, and —11"— to which the corresponding contacts of the circuit breakers are connected are preferably tensioned to press said contacts toward their companion contacts on the bar —5— but are limited in such movement by stops —13— in such manner as to assure the desired succession of separation as previously described.

The heater coil —6— preferably surrounds a portion of the bar —5— to impart its heat thereto and has one end connected by a wire —14— to the brush —1— of the dynamo and its other end electrically connected to said bar thereby placing the coil across the main circuit of the dynamo and also connecting a portion of said bar in the same circuit in series with the heater coil.

A suitable switch —15— is connected in the dynamo and battery circuits in such manner that both circuits may be opened or closed by a single operation.

Compensating bar.

The means for preventing the opening of the circuit breakers —10—, —10'—, and —10"— under varying external or atmospheric temperatures preferably consists of a supplemental thermostatic bar —5'— secured at one end to the bar —5— and similar thereto except that it is somewhat shorter and that its members are reversed so that the free ends of both bars will tend to deflect in opposite directions under like temperatures.

The free end of the bar —5'— is held between opposed adjustable stops —16— which are mounted in stationary supports —17—.

It is now clear that aside from the heater —6— both bars are subject to deflection in opposite directions by the same external or atmospheric temperatures and that any tendency of the bar —5— to deflect sufficiently to open the contacts of the circuit breakers is counteracted or compensated by the reverse action of the bar —5'— against its stops —16— which also serve to properly adjust the contacts.

That is, if the free end of the bar —5— tends to move downwardly the free end of the bar —5'— will tend to move upwardly but will be held against such upward movement by the upper stop —16—, the effect of which is to keep the contacts closed until the temperature of the bar —5— exceeds that of the bar —5'— as for example, when heated by the electric heater —6— in the manner previously described.

*Operation.*

Assuming that the device is used in connection with a starting, lighting, ignition, and charging circuits of a motor vehicle having an internal combustion engine as its motive power, and that the dynamo is being driven by the engine at widely varying speeds with the switch —15— closed.

Then the dynamo circuit will first be closed from brush —2— through wire —14'—, thermostatic bar —5—, contacts —10"— and conductor —11"—, and return through wire —14"— and shunt field —a'— to the third brush —3— of the dynamo, thereby cutting the resistances out of this circuit as long as the contacts remain closed the battery charging circuit being also closed from brush —2— through series winding —a—, switch —15—, and wire —b—, thence through the battery —B— and return through wire —b'— to brush —1— of the dynamo.

Now, as the speed of the dynamo increases, tending thereby to increase its current output or voltage beyond a safe limit for charging purposes, it will cause a corresponding heating of the coil —6— which will impart its heat to the bar —5— and cause the latter to be deflected sufficiently to first open the contacts —10"— and thereby cut in the corresponding resistance —4"— to conteract a further increase in the current output of the dynamo.

If the heat of the coil and bar continues to increase, the bar will be further deflected to open the next succeeding contact and thereby cut in additional resistance 4' into the shunt field circuit to further limit the current output as the speed of the dynamo increases, it being understood that if the heat of the bar continues to increase the next succeeding set of contacts —10— will be opened, thereby cutting in all of the resistances —4—, —4'—, and —4"— which are adjusted to keep the current output of the dynamo within safe charging limits under all speeds.

It is now clear that the direct cause of current or voltage regulation is an increase or decrease of voltage across the terminals of the battery or generator, and that such variation causes a corresponding variation of temperature in the small heating unit —6— so that the heater circuit is from the brush —2— or corresponding pole of the battery —B— and thence through the closed switch —15—, wire —14'— and portion of the thermostatic bar —5— to one end of the heater coil —6— which is electrically connected to said bar thence through the heater coil and return by wire —14'— to the brush —1— of the generator or to the corresponding pole of the battery —B—.

In the drawing I have indicated diagrammatically the crank shaft as —e— of an internal combustion engine having a pulley —f— connected by a belt —f'— to a relatively smaller pulley —g— on the commutator shaft of the dynamo which is not only driven by the internal combustion engine, but is designed to operate as a motor for starting the engine in addition to its function of generating current for charging, lighting, and ignition purposes.

It will be observed that the entire bar, including the parts —5— and —5'—, is pivoted at —12— and that under widely varying atmospheric temperatures affecting both of the thermostatic members exclusively of the heating coil —6—, any tendency of the member —5— to break contact with its resistance contacts —10—, —10'— and —10"— is counter-acted by the buckling of the compensating member —5'— between the stops —16— which holds the end of the member —5'— against lateral deflection so that the extension of the element having the greatest co-efficient of expansion tends to deflect laterally the free end of the member —5'— to one side, but on account of its being held against this lateral movement, the intermediate portion between the pivot —12— and stops —16— buckles and thereby counter-acts the tendency of the member —5— to move away from its contacts.

What I claim is:

1. A regulator for dynamo electric machines including a heating coil in the dynamo circuit, an electrical resistance in said circuit, means including an electric-thermostat normally short circuiting the resistance and in heat-receiving relation to the heating coil, and thermostatic means acting in conjunction with the electric thermostat to oppose the opening of the latter when both thermostats are subjected to varying atmospheric temperatures and to permit the opening of said electric thermostat under the temperature imparted thereto by the heating coil for cutting in the resistance.

2. A regulator for dynamo electric machines including a heating coil in the dynamo circuit, and cooperative thermostatic bars movable about a common axis and subject to deflection under varying atmospheric temperatures, means cooperating with one of the bars when deflected in opposite directions to cause the other bar to maintain a substantially uniform position, said other bar being in heat-receiving relation to the heating coil to cause it to be deflected independently of the first named bar.

3. The combination with a variable speed dynamo electric machine, of a regulator including a heating coil in the dynamo circuit, a normally closed electric thermostat in said circuit and in heat receiving relation to said coil to cause it to be opened by the heat therefrom, and an additional thermostat operatively connected to the first named thermostat to oppose the opening thereof under like atmospheric temperatures and to permit said opening by the heat of the coil.

4. The combination with a dynamo electric machine, a storage battery in charging connection with said machine and an electrical resistance in the dynamo circuit, of a heating coil in said circuit, means including a thermostatic bar normally short circuiting the resistance and in heat-receiving relation to the heating coil to be operated by the heat of said coil for cutting in the resistance, an additional thermostatic bar secured to the first named bar, said bars being movable about a common axis, and means cooperating with the additional bar to prevent the opening of the first named bar when the temperatures of both bars are substantially the same and to permit the opening of the first named bar when its temperature exceeds that of the other bar.

In witness whereof I have hereunto set my hand this 5th day of November, 1919.

ALBERT E. DOMAN.

Witnesses:
H. E. CHASE,
MARGARET L. STOUP.